United States Patent
Iwase et al.

(10) Patent No.: US 9,482,171 B2
(45) Date of Patent: Nov. 1, 2016

(54) CYLINDER-BY-CYLINDER AIR-FUEL-RATIO CONTROLLER FOR INTERNAL COMBUSTION ENGINE

(71) Applicant: DENSO CORPORATION, Kariya, Aichi-pref. (JP)

(72) Inventors: Noriaki Iwase, Obu (JP); Yasuo Mukai, Kariya (JP)

(73) Assignee: DENSO CORPORATION, Kariya (JP)

( * ) Notice: Subject to any disclaimer, the term of this patent is extended or adjusted under 35 U.S.C. 154(b) by 157 days.

(21) Appl. No.: 14/463,188

(22) Filed: Aug. 19, 2014

(65) Prior Publication Data
US 2015/0075507 A1 Mar. 19, 2015

(30) Foreign Application Priority Data
Sep. 17, 2013 (JP) .................................. 2013-192423

(51) Int. Cl.
 F02D 41/00 (2006.01)
 F02D 41/14 (2006.01)
 F02D 41/22 (2006.01)
(52) U.S. Cl.
 CPC ......... F02D 41/1495 (2013.01); F02D 41/008 (2013.01); F02D 41/0085 (2013.01); F02D 41/1439 (2013.01); F02D 41/1454 (2013.01); F02D 41/222 (2013.01); F02D 2041/1417 (2013.01); Y02T 10/40 (2013.01)
(58) Field of Classification Search
 CPC ............. F02D 41/1495; F02D 41/222; F02D 41/0085; F02D 41/1439; F02D 41/1454; F02D 41/008; F02D 2041/1417; Y02T 10/40
 USPC ............................ 123/673–675; 701/102–105
 See application file for complete search history.

(56) References Cited

U.S. PATENT DOCUMENTS

| 5,243,951 | A | * | 9/1993 | Nakaniwa | ........... F02D 41/1454 123/674 |
| 5,715,796 | A | * | 2/1998 | Suzuki | .................. F02D 41/008 123/492 |
| 5,732,689 | A | * | 3/1998 | Ohno | .................... F02D 41/008 123/673 |
| 5,816,230 | A | * | 10/1998 | Kurokawa | ............ F02D 41/008 123/674 |
| 5,915,368 | A | * | 6/1999 | Ishida | ................... F02D 41/047 123/675 |
| 6,292,739 | B1 | * | 9/2001 | Yasui | .................... F02D 41/008 60/276 |

(Continued)

FOREIGN PATENT DOCUMENTS

JP 2007321620 A * 12/2007

OTHER PUBLICATIONS

Iwase, et al., U.S. Appl. No. 14/463,281, filed Aug. 19, 2014.

*Primary Examiner* — Joseph Dallo
(74) *Attorney, Agent, or Firm* — Nixon & Vanderhye P.C.

(57) ABSTRACT

An ECU executes a cylinder-by-cylinder air-fuel-ratio control in which an air-fuel-ratio of each cylinder is estimated based on a detection value of an air-fuel-ratio sensor to adjust the air-fuel-ratio of each cylinder. Further, the ECU computes a learning value of a correction quantity for each cylinder, which is obtained by executing the cylinder-by-cylinder air-fuel-ratio control. Then, the ECU determines whether the estimated air-fuel-ratio has converged according to whether the estimated air-fuel-ratio of each cylinder has been closer to a target value than a specified value for not less than a specified time period. A computation of the learning value is prohibited until the estimated air-fuel-ratio has converged. Therefore, it can be avoided to compute the learning value based on the fuel correction quantity that is obtained when the estimated air-fuel-ratio has not converged yet.

9 Claims, 9 Drawing Sheets

(56) References Cited

U.S. PATENT DOCUMENTS

| | | | | |
|---|---|---|---|---|
| 7,047,957 B1* | 5/2006 | Smith | F01L 1/053 123/508 | |
| 2004/0103890 A1* | 6/2004 | Yasui | F02D 41/0085 123/673 | |
| 2005/0022797 A1* | 2/2005 | Ikemoto | F02D 41/0032 123/673 | |
| 2005/0072139 A1* | 4/2005 | Kato | F02D 41/1402 60/285 | |
| 2008/0087259 A1* | 4/2008 | Kato | F02D 41/1441 123/672 | |
| 2009/0024304 A1* | 1/2009 | Takubo | F02D 19/088 701/103 | |
| 2009/0211350 A1* | 8/2009 | Iwazaki | G01M 15/104 73/114.72 | |
| 2010/0024790 A1* | 2/2010 | Fujiwara | F02D 13/023 123/674 | |
| 2010/0211290 A1* | 8/2010 | Kidokoro | F02D 41/1408 701/103 | |
| 2010/0250074 A1* | 9/2010 | Hirasako | B60W 30/18072 701/55 | |
| 2011/0011378 A1* | 1/2011 | Nakamura | F02D 41/1495 123/568.16 | |
| 2012/0006307 A1* | 1/2012 | Demura | F02D 41/1454 123/674 | |
| 2012/0065870 A1* | 3/2012 | Okazaki | F02D 41/1441 701/104 | |
| 2012/0116654 A1* | 5/2012 | Toyohara | F02D 41/247 701/104 | |
| 2012/0290192 A1* | 11/2012 | Okazaki | F02D 41/1454 701/103 | |
| 2012/0316756 A1* | 12/2012 | Tsuyuki | F02D 35/023 701/104 | |
| 2013/0073181 A1* | 3/2013 | Mamada | F02D 41/14 701/103 | |
| 2013/0197782 A1* | 8/2013 | Genko | F02D 41/1454 701/103 | |

* cited by examiner

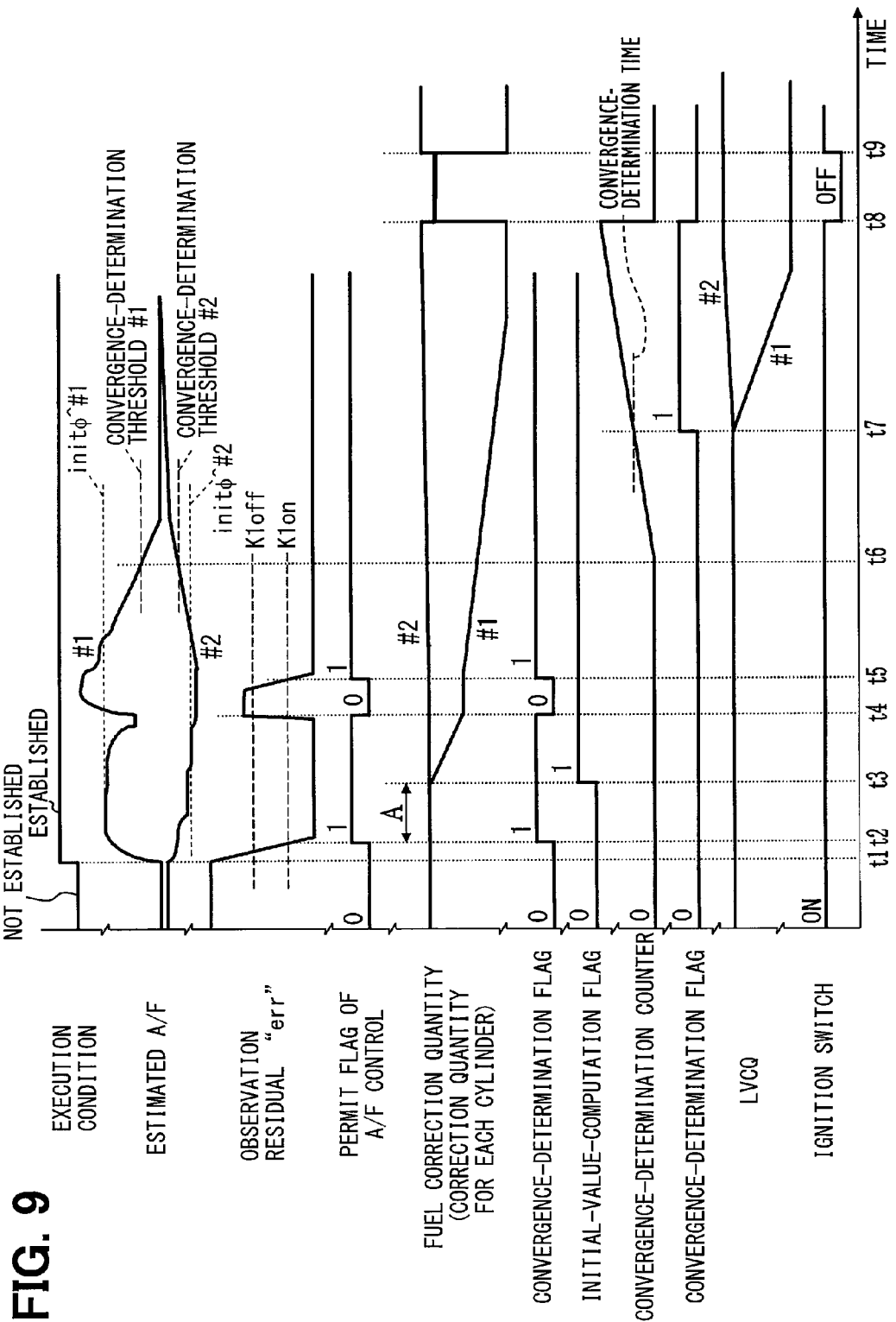

CYLINDER-BY-CYLINDER AIR-FUEL-RATIO CONTROLLER FOR INTERNAL COMBUSTION ENGINE

CROSS-REFERENCE TO RELATED APPLICATION

This application is based on Japanese Patent Application No. 2013-192423 filed on Sep. 17, 2013, the disclosure of which is incorporated herein by reference.

TECHNICAL FIELD

The present disclosure relates to a cylinder-by-cylinder air-fuel-ratio controller that can estimate an air-fuel-ratio of each cylinder based on a detection value of an air-fuel-ratio sensor disposed in a confluent portion of an exhaust gas emitted from an internal combustion engine.

BACKGROUND

In the cylinder-by-cylinder air-fuel-ratio control, an air-fuel-ratio in each cylinder of an internal combustion engine is estimated based on a detection value of an air-fuel-ratio sensor disposed in a confluent portion of an exhaust gas emitted from the internal combustion engine. Based on the estimated air-fuel-ratio of each cylinder, the actual air-fuel-ratio of each cylinder is controlled. Japanese patent No. 4314573 (US-2005/0022797 A1) shows a cylinder-by-cylinder air-fuel-ratio control in which a learning value of a correction quantity (air-fuel-ratio learning value) for each cylinder is computed based on the correction quantity for each cylinder (fuel correction quantity). The learning value is stored in a backup memory. The cylinder-by-cylinder air-fuel-ratio control is executed based on the stored learning value.

In a system in which an air-fuel-ratio of each cylinder is estimated based on a detection value of an air-fuel-ratio sensor to adjust the air-fuel-ratio of each cylinder, it is likely that an air-fuel-ratio detection timing (sampling timing of air-fuel-ratio sensor output) may deviate from a proper detection timing. If the air-fuel-ratio detection timing deviates, an estimation accuracy of the air-fuel-ratio of each cylinder is deteriorated and the estimated air-fuel-ratio between cylinders does not converge even if the cylinder-by-cylinder air-fuel-ratio control is continued.

However, in the air-fuel-ratio control shown in Japanese patent No. 4314573 (US-2005/0022797 A1), even though the estimated air fuel ratios between cylinders does not converge, the learning value of the correction quantity for each cylinder is computed based on the correction quantity obtained by executing the air-fuel-ratio control. As a result, it is likely that the learning value of the correction quantity for each cylinder may be erroneously learned.

SUMMARY

It is an object of the present disclosure to provide an air-fuel-ratio controller for an internal combustion engine, which is able to avoid an erroneous learning of a learning value of a correction quantity for each cylinder due to a deviation of an air-fuel-ratio detection timing.

According to the present disclosure, a cylinder-by-cylinder air-fuel-ratio controller includes an air-fuel-ratio sensor detecting an air-fuel-ratio of an exhaust gas at a confluent portion into which the exhaust gas flows from each of multiple cylinders of the internal combustion engine; an estimation portion estimating the air-fuel-ratio of each cylinder based on a detection value which the air-fuel-ratio sensor detects at an air-fuel-ratio detection timing for each cylinder; and a control portion executing a cylinder-by-cylinder air-fuel-ratio control in which the air-fuel-ratio of each cylinder is controlled based on the estimated air-fuel-ratio of each cylinder.

Further, the cylinder-by-cylinder air-fuel-ratio controller includes: a learning portion computing a learning value of a correction quantity for each cylinder, which is obtained by executing the cylinder-by-cylinder air-fuel-ratio control; a convergence-determination portion determining whether the estimated air-fuel-ratio has converged; and leaning-prohibit portion prohibiting a computation of the learning value of the correction quantity for each cylinder until the convergence-determination portion determines that the estimated air-fuel-ratio has converged.

According to the above configuration, it is determined whether the estimated air-fuel-ratio has converged. Until it is determined that the estimated air-fuel-ratio has converged, it is prohibited to compute the learning value When it is determined that the estimated air-fuel-ratio has converged, the learning value is computed. Therefore, it can be avoided to compute the learning value based on the fuel correction quantity that is obtained when the estimated air-fuel-ratio has not converged yet. An erroneous learning of the learning value can be avoided.

BRIEF DESCRIPTION OF THE DRAWINGS

The above and other objects, features and advantages of the present disclosure will become more apparent from the following detailed description made with reference to the accompanying drawings. In the drawings:

FIG. 9 is a time chart showing an example of a correction quantity learning.

DETAILED DESCRIPTION

Figure 1:
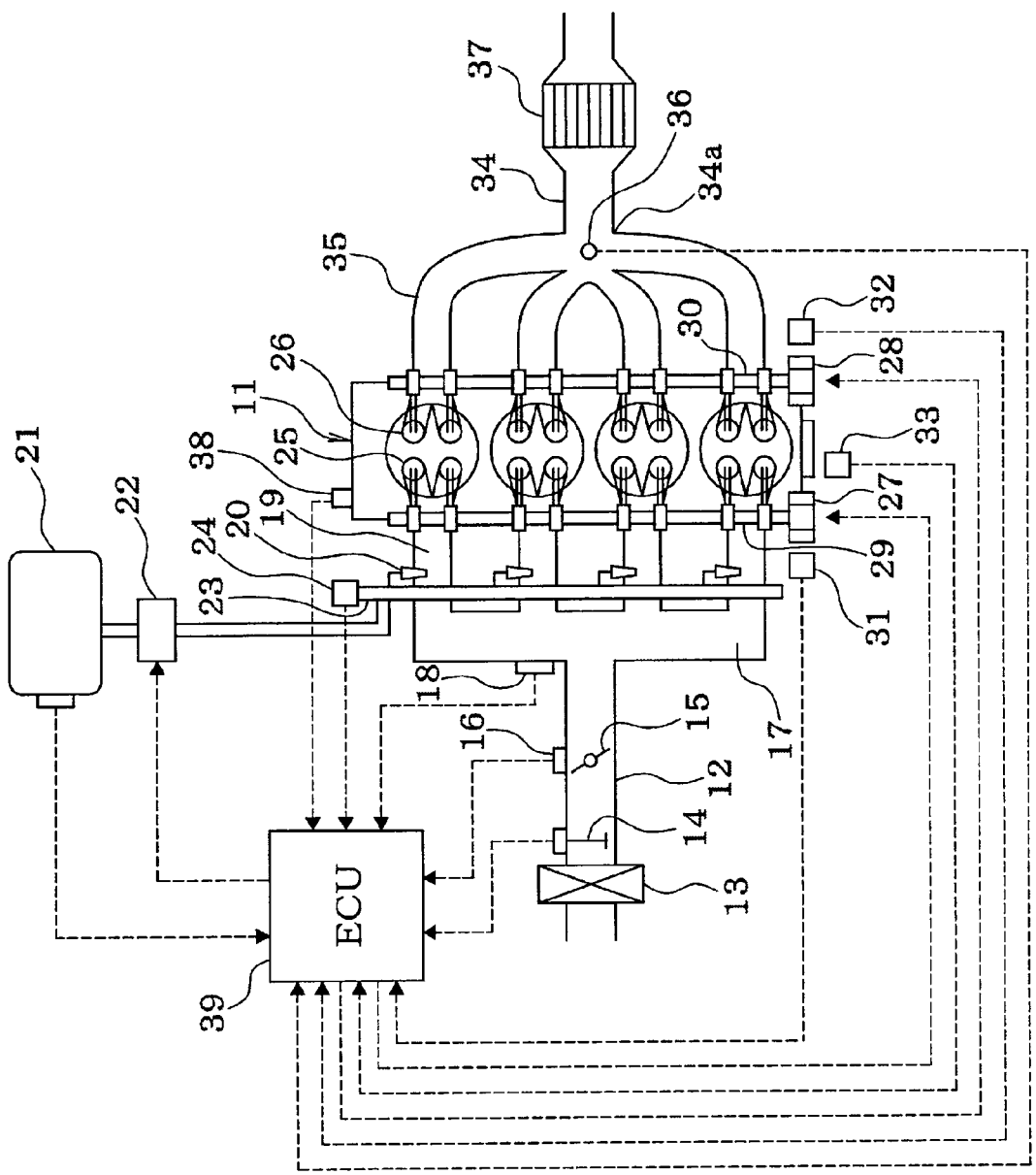
FIG. 1 is a schematic view of an engine control system according to an embodiment.

An embodiment will be described hereinafter. First, referring to FIG. 1, an engine control system is explained. A four-cylinder engine 11 has a first cylinder #1, a second cylinder #2, a third cylinder #3 and a fourth cylinder #4. An air cleaner 13 is arranged upstream of an intake pipe 12 of an internal combustion engine 11. An airflow meter 14 detecting an intake air flow rate is provided downstream of the air cleaner 13. A throttle valve 15 driven by a DC-motor and a throttle position sensor 16 detecting a throttle position are provided downstream of the air flow meter 14.

A surge tank 17 including an intake air pressure sensor 18 is provided downstream of the throttle valve 15. The intake air pressure sensor 18 detects intake air pressure. An intake manifold 19 that introduces air into each cylinder of the engine 11 is provided downstream of the surge tank 17, and the fuel injector 20 that injects the fuel is provided at a vicinity of an intake port of the intake manifold 19 of each cylinder. While the engine 11 is running, the fuel in the fuel tank 21 is supplied to a delivery pipe 23 by a fuel pump 22. The fuel injector 20 provided to each cylinder injects the fuel into a cylinder. A fuel pressure sensor 24 detecting a fuel pressure is attached to the delivery pipe 23.

The engine 11 is provided with variable valve timing controllers 27, 28 that respectively adjust a valve timing of an intake valve 25 and an exhaust valve 26. Furthermore, the engine 11 is provided with an intake-cam-angle sensor 31 and an exhaust-cam-angle sensor 32. A crank angle sensor 33 is arranged for detecting a rotational angle of a crankshaft. The crank angle sensor 33 outputs a crank angle signal when the crankshaft rotates 30° CA, for example.

At a confluent portion 34a of an exhaust manifold 35, an air-fuel-ratio sensor 36 that detects the air-fuel-ratio of the exhaust gas is provided. A three-way catalyst 37 that purifies the exhaust gas is provided downstream of the air-fuel-ratio sensor 36. A coolant temperature sensor 38 detecting coolant temperature is fixed on the cylinder block of the engine 11.

The outputs of the above sensors are transmitted to an electronic control unit (ECU) 39. The ECU 39 includes a microcomputer that executes an engine control program stored in a Read Only Memory (ROM) to control a fuel injection quantity, an ignition timing, a throttle position (intake air flow rate) and the like.

When an air-fuel-ratio feedback control execution condition is established, the ECU 39 executes an air-fuel-ratio feedback control in which the air-fuel-ratio of the air-fuel mixture is controlled based on the output of the air-fuel-ratio sensor 36 so that the air-fuel-ratio of the exhaust gas agrees with the target air-fuel-ratio.

Figure 2:
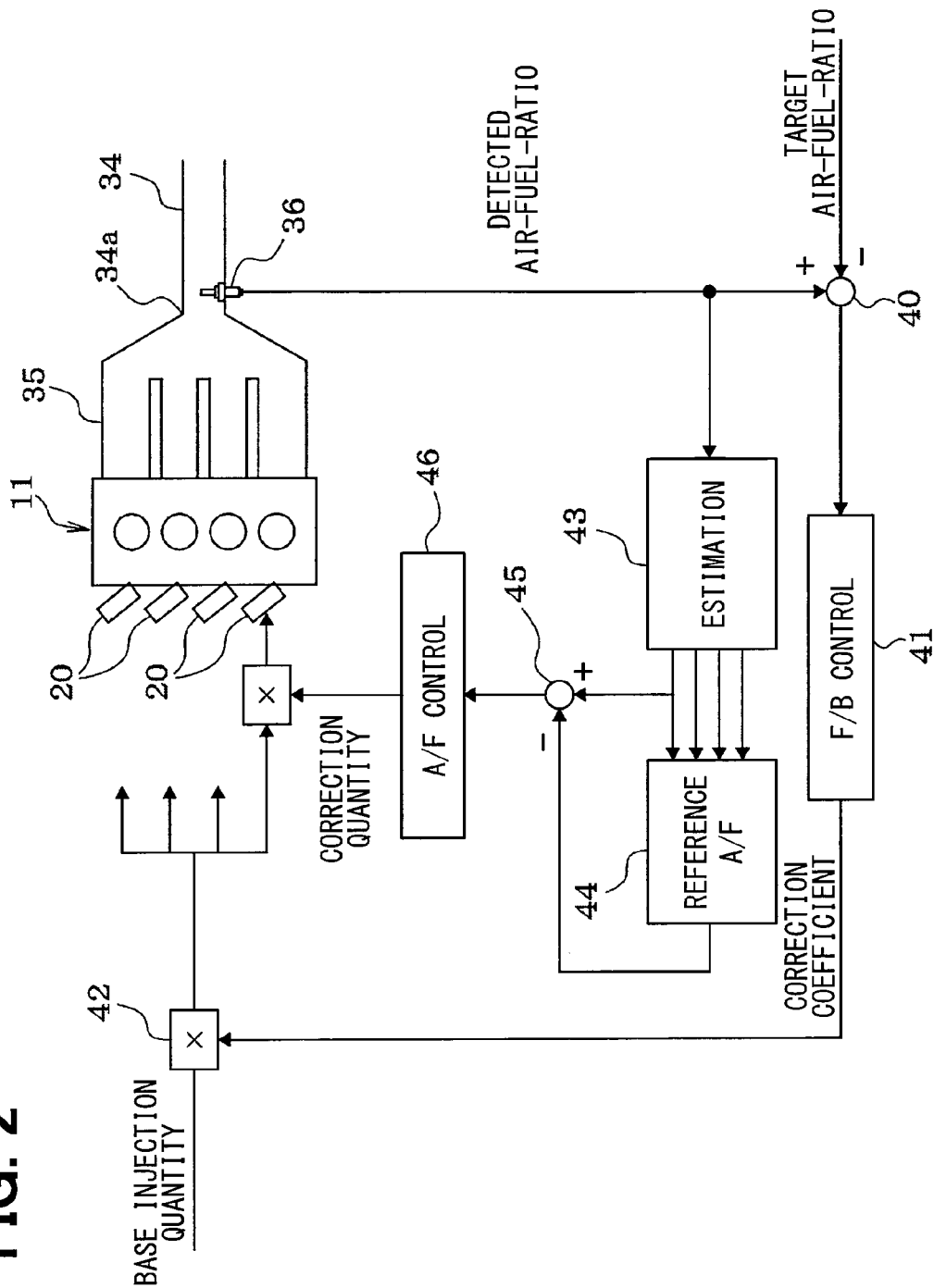
FIG. 2 is a block diagram for explaining an air-fuel-ratio control.

Specifically, as shown in FIG. 2, a difference computing portion 40 computes a difference between the detected air-fuel-ratio (air-fuel-ratio of exhaust gas detected by the air-fuel-ratio sensor 36) and the target air-fuel-ratio. An air-fuel-ratio control portion 41 computes a correction coefficient in order to reduce the difference. An injection-quantity computing portion 42 computes a fuel injection quantity based on a base quantity and the correction coefficient, which are computed based on an engine speed and an engine load. Each of fuel injectors 20 injects the fuel of the computed injection quantity.

Furthermore, the ECU 39 executes a cylinder-by-cylinder air-fuel-ratio estimation shown in FIGS. 4 to 7, whereby the air-fuel-ratio of each cylinder is estimated based on a detection value of an air-fuel-ratio sensor 36. The air-fuel-ratio sensor 36 detects the air-fuel-ratio of each cylinder at an air-fuel-ratio detection timing for each cylinder. Based on the estimated air-fuel-ratio of each cylinder, the air-fuel-ratio of each cylinder is controlled. Such a control is referred to as a cylinder-by-cylinder air-fuel-ratio control. Furthermore, based on the correction quantity for each cylinder, the ECU 39 computes and stores a cylinder-by-cylinder learning value of the correction quantity for each cylinder, which will be referred to as "LVCQ", hereinafter.

Specifically, as shown in FIG. 2, an air-fuel-ratio estimation portion 43 estimates the air-fuel-ratio of each cylinder based on the detection value (actual air-fuel-ratio of the exhaust gas flowing through the confluent portion 34a) of the air-fuel-ratio sensor 36 by using of an air-fuel-ratio estimation model, which will be described later. A reference air-fuel-ratio computation portion 44 computes an average value of the estimated air-fuel-ratio of all cylinders. The computed average value is defined as a reference air-fuel-ratio (target air-fuel-ratio of all cylinders). Then, an air-fuel-ratio deviation computation portion 45 computes a deviation between the estimated air-fuel-ratio of each cylinder and the reference air-fuel-ratio. An air-fuel-ratio control portion 46 computes a fuel correction quantity for each cylinder so that the deviation between the estimated air-fuel-ratio of each cylinder and the reference air-fuel-ratio becomes smaller. The fuel injection quantity of each cylinder is corrected based on the calculating result. The air-fuel-ratio of the air-fuel mixture supplied to each cylinder is corrected so that the air-fuel-ratio dispersion between cylinders becomes smaller.

Furthermore, the air-fuel-ratio control portion 46 computes the "LVCQ" based on the fuel correction quantity of each cylinder. When an ignition switch (not shown) is off, the "LVCQ" are stored in a backup memory (not shown) of the ECU 39. The backup memory is a nonvolatile memory, such as a backup RAM.

The air-fuel-ratio estimation model will be specifically described, hereinafter. The air-fuel-ratio estimation model is for estimating the air-fuel-ratio of each cylinder based on the detection value (actual air-fuel-ratio of the exhaust gas flowing through the confluent portion In view of a heat exchange in the confluent portion 34a, the detected value of the air-fuel-ratio sensor 36 is modeled by adding a history of the estimated air-fuel-ratio of each cylinder at the confluent portion 34a to a history of the detected value of the air-fuel-ratio sensor 36. The histories are multiplied by a specified weight. Based on the above model, the air-fuel-ratio of each cylinder is estimated. Kalman filter is used as an observer.

More specifically, a model of gas-exchange at the confluent portion 34a is approximated by the following formula (1):

$$ys(t)=k1 \times u(t-1)+k2 \times u(t-2)-k3 \times ys(t-1)-k4 \times ys(t-2) \quad (1)$$

wherein "ys" represents a detected value of the air-fuel-ratio sensor 36, "u" represents an air-fuel-ratio of gas flowing into the fluent-portion 34a, and "k1" to "k4" represent constants.

In the exhaust system, there are a first order lag of exhaust gas flowing into the confluent portion 34a and a first order lag of a response of the air-fuel-ratio sensor 36. In view of these first order lags, the past two histories are referred in the above formula (1).

The above formula (1) is converted into a state space model, whereby following formulas (2a) and (2b) are derived.

$$X(t+1)=A \cdot X(t)+B \cdot u(t)+W(t) \quad (2a)$$

$$Y(t)=C \cdot X(t)+D \cdot u(t) \quad (2b)$$

wherein, "A", "B", "C" and "D" represent parameters of the model, "Y" represents the detected value of the air-fuel-ratio sensor 36, "X" represents the estimate air-fuel-ratio of each cylinder as a state variable, and "W" represents noise.

Furthermore, based on the above formulas (2a) and (2b), the Kalman filter is obtained as shown by the following formula (3).

$$X\hat{\,}(k+1|k)=A \cdot X\hat{\,}(k|k-1)+K\{Y(k)-C \cdot A \cdot X\hat{\,}(k|k-1)\} \quad (3)$$

wherein "X^" represents the estimated air-fuel-ratio of each cylinder and "K" represents Kalman gain. X^(k+1|k)

represents to obtain an estimation value at a time (k+1) based on the estimation value at a time (k).

As described above, the air-fuel-ratio estimation model is configured, by Kalman-filter type observer, whereby the air-fuel-ratio of each cylinder can be successively estimated along with an advance of a combustion cycle.

Next, a method for establishing the air-fuel-ratio detection timing of each cylinder will be explained. In view of a response delay of the air-fuel-ratio sensor, the air-fuel-ratio detection timing of each cylinder is established according to an engine driving condition (engine speed, engine load, etc.) by use of a map. The output of the air-fuel-ratio sensor 36 is transmitted to the ECU 39. Since the response delay of an exhaust gas system becomes larger as the engine load becomes smaller, the air-fuel-ratio detection timing is established in such a manner as to shift in a retard direction as the engine load becomes smaller.

However, a length of the exhaust manifold 35 from the exhaust port of each cylinder to the air-fuel-ratio sensor 36 is different between each cylinder. The flow of the exhaust gas emitted from each cylinder varies according to the engine driving condition. Further, the response delay of the air-fuel-ratio sensor varies due to a manufacture dispersion of the engine 11 and deterioration with age. Thus, it is difficult to accurately make a map between the response delay of the air-fuel-ratio sensor and an engine load before the engine is designed and manufactured. The air-fuel-ratio detection timing of each cylinder may deviate from the proper air-fuel-ratio detection timing.

If the air-fuel-ratio detection timing deviates, an estimation accuracy of the air-fuel-ratio of each cylinder is deteriorated and the estimated air-fuel-ratio of each cylinder does not converge even if the cylinder-by-cylinder air-fuel-ratio control is continued. That is, the dispersion of the estimated air-fuel-ratio between cylinders does not become smaller.

The ECU 39 executes an air-fuel-ratio detection timing determination. In the air-fuel-ratio detection timing determination, the ECU 39 determines whether a deviation in air-fuel-ratio detecting timing exists based on the estimated air-fuel-ratio while the cylinder-by-cylinder air-fuel-ratio control is performed. When the ECU 39 determines that the deviation exists, the air-fuel-ratio detection timing is corrected.

For example, a Local-learning is first executed. In the Local-learning, the air-fuel-ratio detecting timing is corrected so that dispersion of the detection values of the air-fuel-ratio sensor 36 becomes maximum in one cycle (720° CA) of the engine 11. After executing the Local-learning, a Global-learning is executed. In the Global-learning, the air-fuel-ratio detecting timing is corrected based on a relationship between a variation of the estimated air-fuel-ratio of at least one cylinder and a variation of the correction value (correction amount of fuel). It should be noted that the estimated air fuel ratio is assumed to correspond to one of cylinders #1 to #4. In the Global-learning, the cylinder corresponding to the estimated air fuel ratio is hypothetically varied from the cylinder #1 to the cylinder #4. With respect to at least one of the cylinders #1 to #4, a correlation coefficient between the variation of the estimated air fuel ratio and the variation of the fuel quantity correction value is computed. Then, the air-fuel-ratio detecting time is corrected so that this correlation coefficient becomes maximum.

Alternatively, after the Local-learning is executed to correct the air-fuel-ratio detecting timing, the Global-learning is executed. In the Global-learning, the air-fuel-ratio detection timing is corrected by a combustion interval of the engine (for example, 180° CA). Alternatively, the air-fuel-ratio detecting timing is multiplied twice or more. The air-fuel-ratio detection timing of each cylinder is replaced by the air-fuel-ratio detection timing of other cylinders. The air-fuel-ratio detection timing of each cylinder can be corrected to the correct air-fuel-ratio detection timing.

If the air-fuel-ratio detection time deviates, an estimation accuracy of the air-fuel-ratio of each cylinder is deteriorated and the estimated air-fuel-ratio of each cylinder does not converge even though the cylinder-by-cylinder air-fuel-ratio control is continued. It is likely that the "LVCQ" may be erroneously learned.

Figure 5:
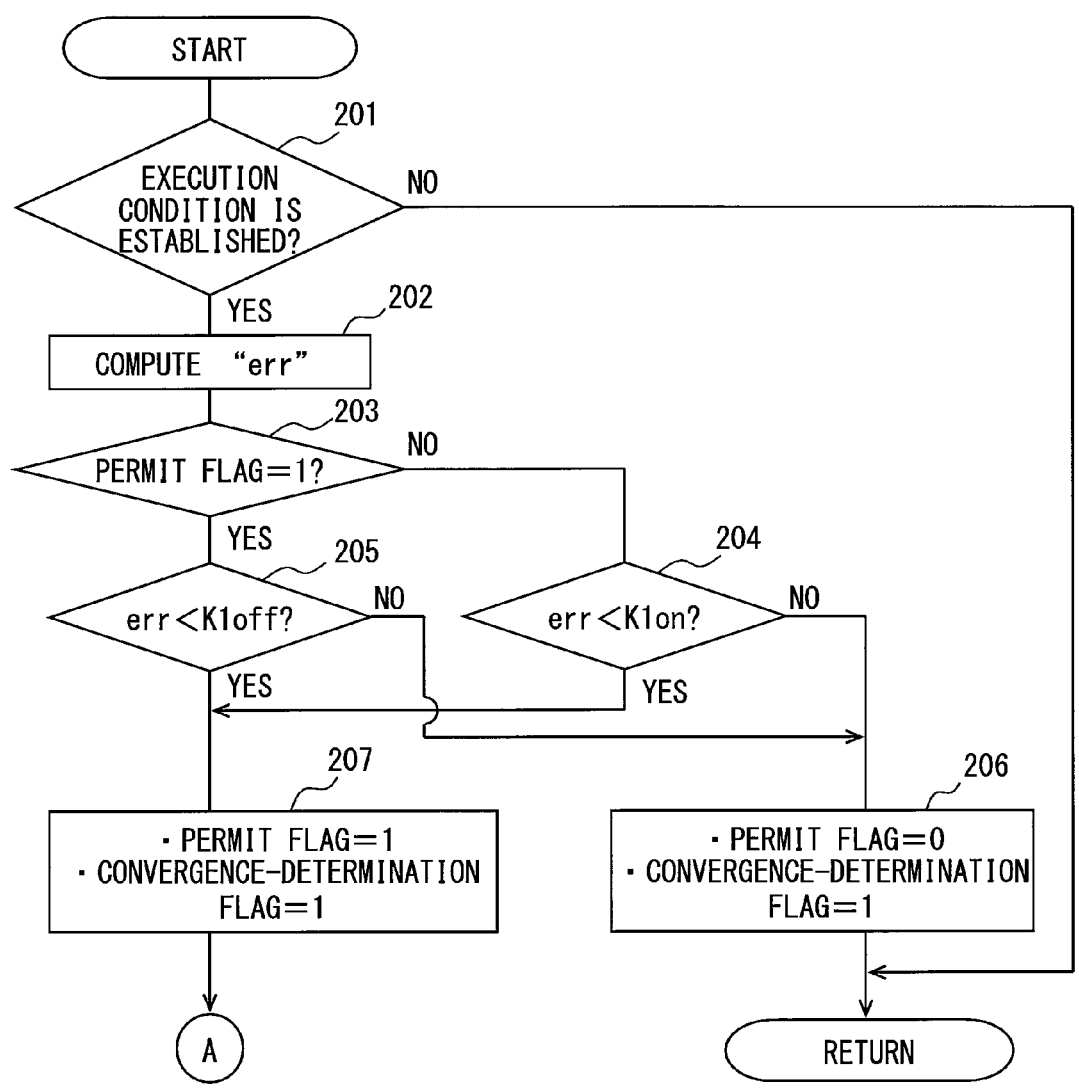
FIG. 5 is a first flow chart showing a processing of a cylinder-by-cylinder air-fuel-ratio and a convergence-determination control routine.
Figure 6:
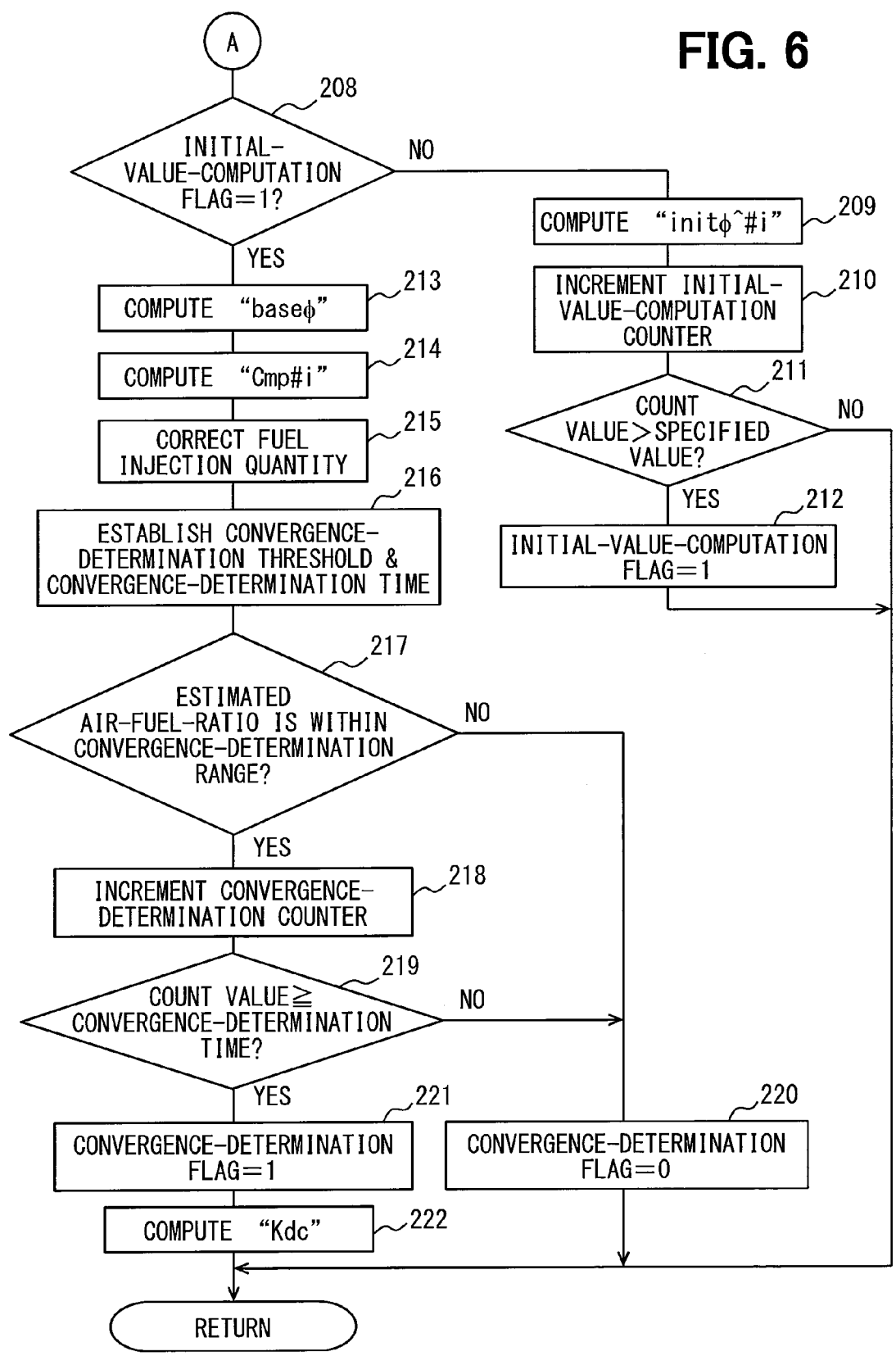
FIG. 6 is a second flow chart showing a processing of a cylinder-by-cylinder air-fuel-ratio and a convergence-determination control routine.

In order to avoid the above situation, the ECU 39 executes a routine shown in FIGS. 5 and 6. The ECU 39 determines whether the estimated air-fuel-ratio of each cylinder is converged. A condition in which the estimated air-fuel-ratio of each cylinder is converged will be referred to as "EACC" hereinafter. The ECU 39 prohibits a computation of the "LVCQ" until the ECU 39 determines that it is the "EACC".

Figure 3:
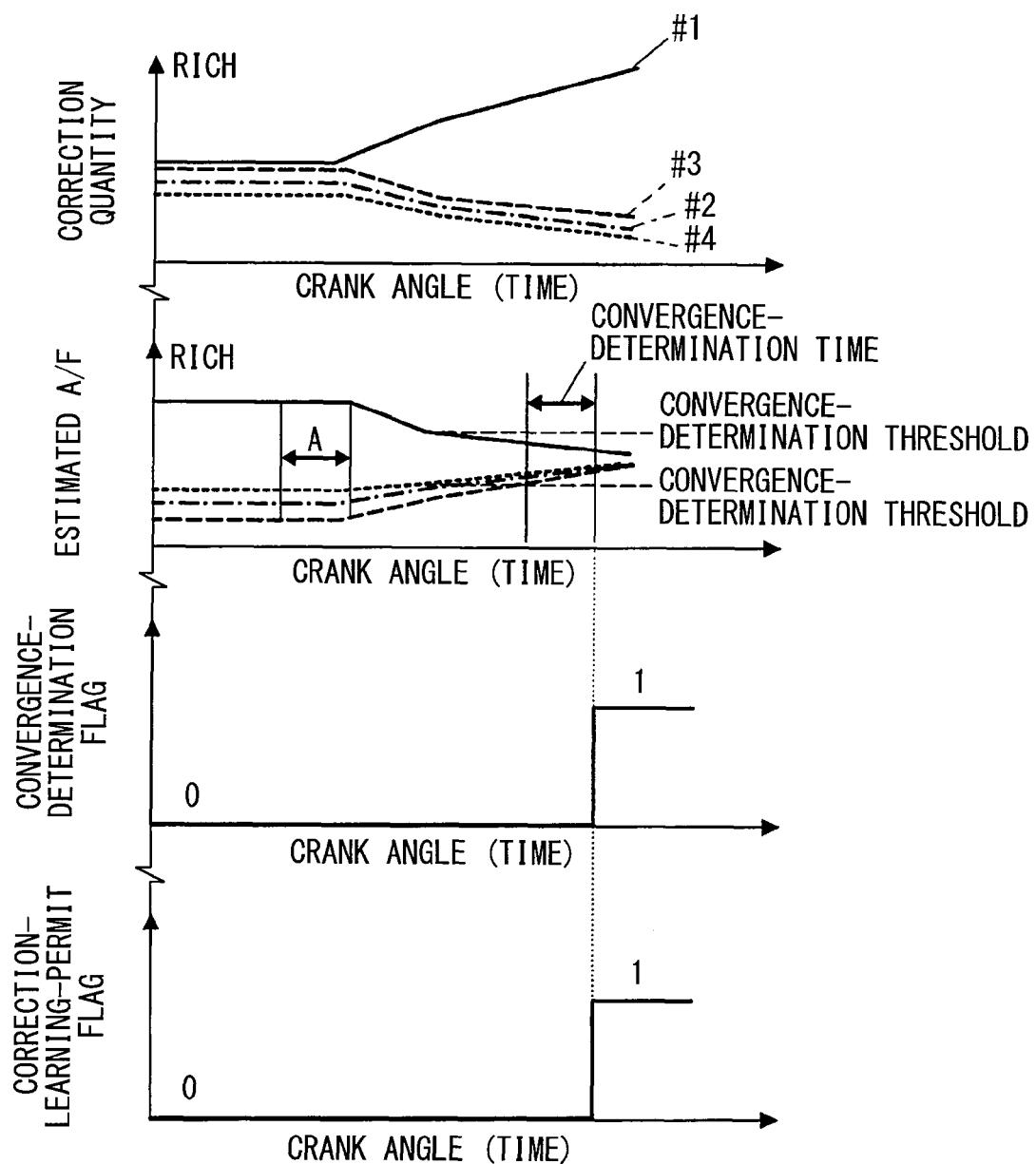
FIG. 3 is a chart showing a convergence-determination of an estimated air-fuel-ratio.

Specifically, as shown in FIG. 3, the ECU 39 computes an initial estimated air-fuel-ratio for each cylinder based on the estimated air-fuel-ratio in a specified period "A" before starting of the cylinder-by-cylinder air-fuel-ratio control. Furthermore, the ECU 39 establishes a convergence-determination threshold (specified value) for each cylinder and a convergence-determination time (specified time period) according to the initial estimated air-fuel-ratio.

Then, the ECU 39 determines whether it is the "EACC" according to whether the estimated air-fuel-ratio of each cylinder has been closer to a target value (reference air-fuel-ratio) than the convergence-determination threshold for the convergence-determination time. When the estimated air-fuel-ratio of each cylinder has not been closer to a target value than the convergence-determination threshold for not less than the convergence-determination time, the ECU 39 determines that it is not the "EACC" and keeps a convergence-determination flag at "0". The ECU 39 prohibits a computation of the "LVCQ". A correction-learning-permit flag is kept "0".

After that, when the estimated air-fuel-ratio has been closer to the target value than the convergence-determination threshold for the convergence-determination time, the ECU 39 determines that it is the "EACC" and sets the convergence-determination flag at "1". The ECU 39 permits the computation of the "LVCQ". The correction-learning-permit flag is kept "1".

Figure 8:
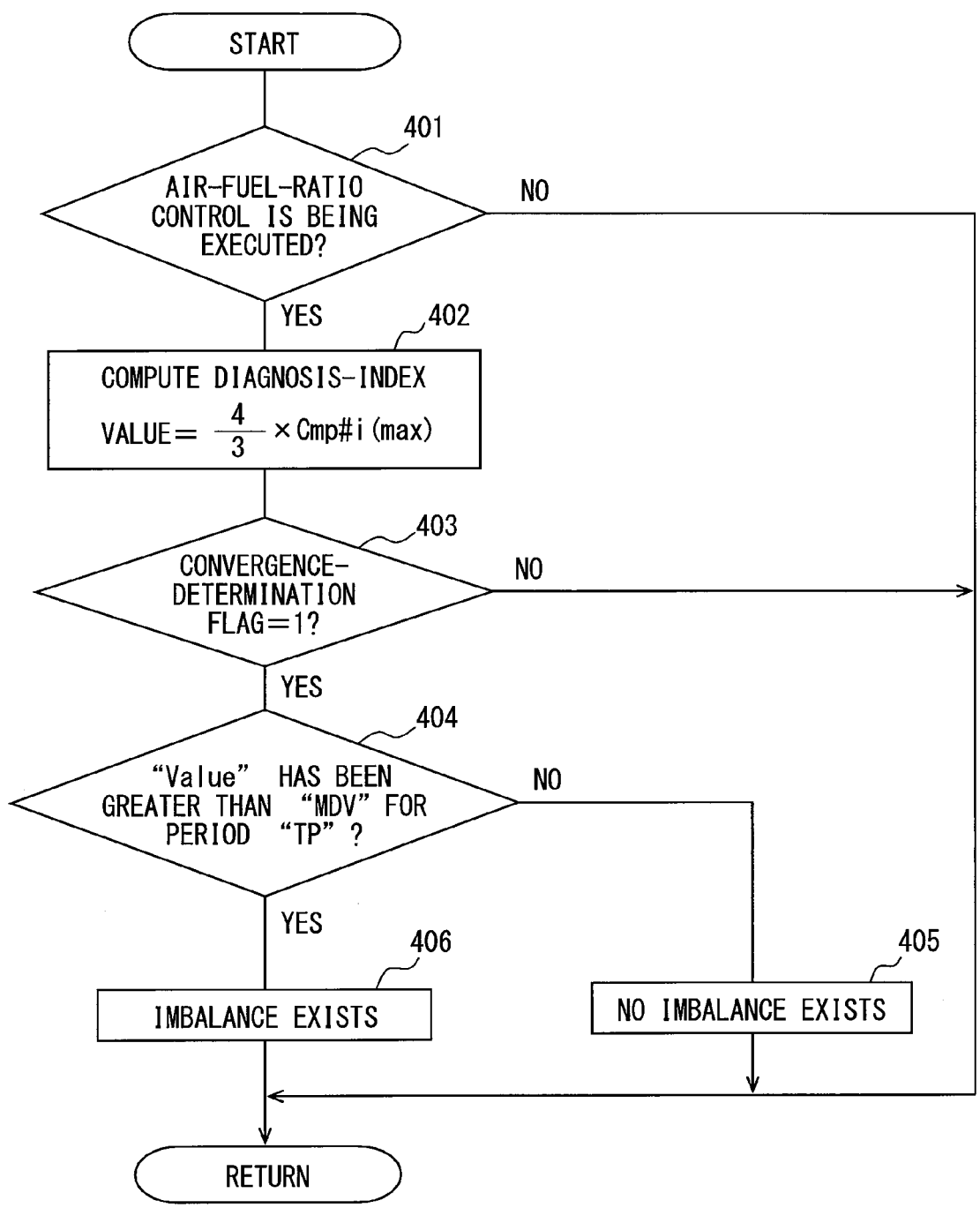
FIG. 8 is a flow chart showing a processing of an imbalance diagnosis routine.

Moreover, the ECU 39 executes an imbalance diagnosis shown in FIG. 8. In the imbalance diagnosis, the ECU 39 determines whether an imbalance malfunction occurs in the engine 11 based on the correction quantity for each cylinder, which is obtained by executing the cylinder-by-cylinder air-fuel-ratio control after the ECU 39 determines that it is the "EACC". The imbalance malfunction represents a malfunction in which dispersion in fuel injection quantity or intake air flow rate between cylinders exceeds a permissible level.

Referring to FIGS. 4 to 8, a processing of each routine which the ECU 39 executes will be described hereinafter.

[Cylinder-by-Cylinder Air-Fuel-Ratio Estimation Routine]

Figure 4:
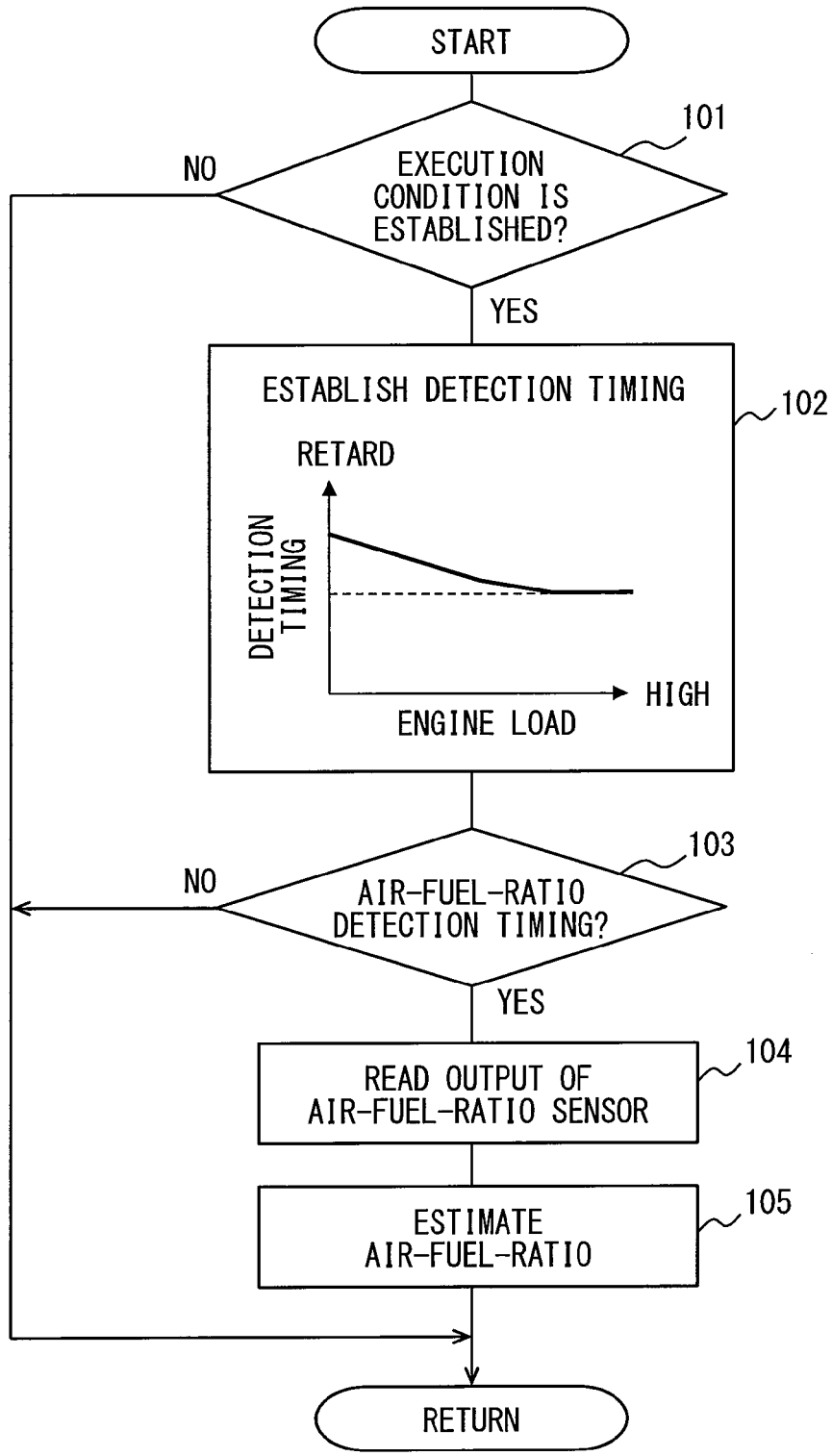
FIG. 4 is a flow chart showing a processing of a cylinder-by-cylinder air-fuel-ratio estimation routine.

A cylinder-by-cylinder air-fuel-ratio estimation routine shown in FIG. 4 is executed in synchronization with an output pulse of the crank angle sensor 33. This cylinder-by-cylinder air-fuel-ratio estimation routine corresponds to a cylinder-by-cylinder air-fuel-ratio estimation portion. In step 101, the computer of the ECU 39 determines whether an execution condition of the cylinder-by-cylinder air-fuel-ratio control is established. The execution condition includes following conditions (1)-(4):

(1) The air-fuel-ratio sensor 36 is activated.
(2) The air-fuel-ratio sensor 36 has no malfunction.
(3) The engine 11 is in warming-up condition (for example, coolant temperature is higher than a specified temperature).
(4) An engine driving region (for example, engine speed and intake air pressure) is a driving region in which an air-fuel-ratio estimation accuracy can be ensured.

When the above four conditions (1)-(4) are satisfied, the execution condition of cylinder-by-cylinder air-fuel-ratio control is established. If at least one of the conditions is not satisfied, the execution condition is not established. When the execution condition is not established, the routine ends.

Meanwhile, when the execution condition is established, the procedure proceeds to step 102 in which the air-fuel-ratio detecting timing of each cylinder is established in view of a map according to the current engine load (for example, intake air pressure). Alternatively, the air-fuel-ratio detecting timing of each cylinder may be established in view of a map according to the current engine load and the current engine speed. The map for establishing the air-fuel-ratio detection timing is corrected by executing a Local-learning routine or a Global-learning routine.

Then, the procedure proceeds to step 103 in which the computer determines whether the current crank angle corresponds to the air-fuel-ratio detection timing established in step 102. When the answer is NO, the routine ends.

When the answer is YES in step 103, the procedure proceeds to step 104 in which the computer reads the output (air-fuel-ratio detection value) of the air-fuel-ratio sensor 36. Then, the procedure proceeds to step 105 in which the air-fuel-ratio of the cylinder which is subject to estimate is estimated based on the detection value of the air fuel ratio sensor 36 by using of the air-fuel-ratio estimation model.

[Air-Fuel-Ratio Control and Convergence-Determination Routine]

A cylinder-by-cylinder air-fuel-ratio control and convergence-determination routine shown in FIGS. 5 and 6 is executed in synchronization with an output pulse of the crank angle sensor 33. This cylinder-by-cylinder air-fuel-ratio control routine corresponds to a cylinder-by-cylinder air-fuel-ratio control portion and a convergence-determination portion. In step 201, the computer determines whether the above execution condition of the cylinder-by-cylinder air-fuel-ratio control is established. When the execution condition is not established, the routine ends.

When the execution condition is established, the procedure proceeds to step 202 in which the observation residual "err" is computed based on the detected value φ (actual air-fuel-ratio of the emission gas flowing through the confluent portion 34a) of the air-fuel-ratio sensor 36 and the estimated air-fuel-ratio φ^, according to the following formula (4). The observation residual "err" is normalized by means of amplitude of the detected value φ. The amplitude of the detected value corresponds to a difference between the detected value φ and a target air-fuel-ratio tφ. It should be noted that the detected value φ, the estimated air-fuel-ratio φ^, and the target air-fuel-ratio tφ are respectively expressed by equivalent ratios (inverse number of the excess air ratio).

$$err = \frac{1}{\tau \times s + 1} \times \sqrt{\frac{(\phi - t\phi - \phi^\wedge)^2}{(\phi - t\phi)^2}} \quad (4)$$

In the above formula (4), "τ" is time constant and "s" is Laplace operator. The process in step 202 corresponds to a residual computing portion. Then, the procedure proceeds to step 203 in which the computer determines whether a permit flag of cylinder-by-cylinder air-fuel-ratio control is "1". That is, computer determines whether the cylinder-by-cylinder air-fuel-ratio control is permitted. When the computer determines that the permit flag is "0" in step 203, the procedure proceeds to step 204 in which the computer determines whether the observation residual "err" is less than a permission threshold "K1on".

When the observation residual "err" is greater than or equal to a permit threshold "K1on" in step 204, the procedure proceeds to step 206 in which the permit flag is kept "0" and a convergence-determination flag is kept "0". When the answer is YES in step 204, the procedure proceeds to step 207 in which the permit flag is set to "1" and the convergence-determination flag is set to "1".

When the computer determines that the permit flag is "1" in step 203, the procedure proceeds to step 205 in which the computer determines whether the observation residual "err" is smaller than a prohibition threshold "K1off". The prohibition threshold "K1off" is set larger than the permission threshold "K1on".

When the observation residual "err" is less than the prohibition threshold "K1off" in step 205, the procedure proceeds to step 207 in which the permit flag is kept "1" and the convergence-determination flag is kept "1". When the observation residual "err" is not smaller than a prohibition threshold "K1off" in step 205, the procedure proceeds to step 206 in which the permit flag is reset to "0" and the convergence-determination flag is set to "0".

While the permit flag of the air-fuel-ratio control has been "1", that is, while the convergence-determination flag has been "1", the procedure proceeds to step 208 in which the computer determines whether an initial-value-computation flag is "1". When initial-value-computation flag is "1", a computation of an initial estimated air-fuel-ratio has been completed. When the computer determines that the initial-value-computation flag is "0" in step 208 (computation of the initial estimated air-fuel-ratio has not been completed), the procedure proceeds to step 209 in which the initial estimated air-fuel-ratio "initφ^#i" of each cylinder is computed according to the following formula.

$$init\phi^\wedge \#i = \{1/(\tau \times 2 \times s + 1)\} \times \phi^\wedge \#i \quad (5)$$

It should be noted that φ^#i represents a currently estimated air-fuel-ratio of i-th cylinder #i, and initφ^#i is the initial estimated air-fuel-ratio of i-th cylinder.

Then, the procedure proceeds to step 210 in which a count value of an initial-value-computation counter is incremented. In step 211, the computer determines whether the count value of the initial-value-computation counter is greater than a specified value. When the answer is NO in step 211, the initial-value-computation flag is kept "0" to end the routine.

When the answer is YES in step 211, the procedure proceeds to step 212 in which the initial-value-computation flag is set to "1" to end the routine.

In the above steps 208 to 212, the ECU 39 computes an initial estimated air-fuel-ratio initφ^#i for each cylinder based on the estimated air-fuel-ratio φ^#i, and the cylinder-by-cylinder air-fuel-ratio control is prohibited until the computation of the initial estimated air-fuel-ratio initφ^#i is completed. These processes correspond to an initial value computing portion.

When the computer determines that the initial-value-computation flag is "1" in step 208 (computation of the initial estimated air-fuel-ratio has been completed), the ECU 39 executes the cylinder-by-cylinder air-fuel-ratio control in steps 213 to 215 and a convergence-determination of the estimated air-fuel-ratio in steps 216 to 222.

In step 213, the computer computes an average value of the estimated air-fuel-ratio of all cylinders. The computed average value is defined as a reference air-fuel-ratio base $\phi$.

Then, the procedure proceeds to step 214 in which the computer computes a deviation (base $\phi - \hat{\phi}\#i$) between the estimated air-fuel-ratio $\hat{\phi}\#i$ of each cylinder and the reference air-fuel-ratio base $\phi$. Further, the computer computes a fuel correction quantity Cmp#i according to the following formula so that the deviation (base $\phi - \hat{\phi}\#i$) becomes smaller.

$$Cmp\#i = \int (base\ \phi - \hat{\phi}\#i) dt \qquad (6)$$

Cmp#i represents the fuel correction quantity of i-th cylinder #i. That is, the fuel correction quantity is computed for each cylinder, as a cylinder-by-cylinder correction quantity.

Then, the procedure proceeds to step 215 in which the fuel injection quantity of each cylinder is corrected based on the fuel correction quantity Cmp#i, whereby the air-fuel-ratio dispersion between cylinders is reduced.

Then, the procedure proceeds to step 216 in which the convergence-determination threshold for each cylinder is established according to the initial estimated air-fuel-ratio init $\hat{\phi}\#i$, in view of a map or a formula. That is, the convergence-determination threshold of the i-th cylinder #i is established according to the initial estimated air-fuel-ratio init $\hat{\phi}\#i$. The map or the formula for obtaining the convergence-determination threshold is established in such a manner that a deviation of the convergence-determination threshold from the reference air-fuel-ratio becomes larger as a deviation of the initial estimated air-fuel-ratio from the reference air-fuel-ratio becomes larger.

Further, in view of a map or a formula, the convergence-determination time common to all cylinders is established according to the initial estimated air-fuel-ratio init $\hat{\phi}\#i$. The map or the formula for obtaining the convergence-determination time is established in such a manner that the convergence-determination time becomes longer as a deviation of a maximum initial estimated air-fuel-ratio from the reference air-fuel-ratio becomes smaller.

Then, the procedure proceeds to step 217 in which the ECU 39 determines whether the estimated air-fuel-ratio $\hat{\phi}\#i$ of each cylinder is within a convergence-determination range based on whether the estimated air-fuel-ratio t$\hat{\phi}\#i$ of each cylinder is closer to the target value (reference air-fuel-ratio) than the convergence-determination threshold.

When the ECU 39 determines that at least one of the estimated air-fuel-ratio $\hat{\phi}\#i$ of the cylinder is out of the convergence-determination range, the procedure proceeds to step 220 in which the convergence-determination flag is kept "0" to end the routine.

After that, when the ECU 39 determines that the estimated air-fuel-ratios $\hat{\phi}\#i$ of all cylinders are in the convergence-determination range, the procedure proceeds to step 218 in which a count value of a convergence-determination counter is incremented. In step 219, the computer determines whether the count value of the convergence-determination counter is greater than or equal to a convergence-determination time. When the answer is NO in step 219, the convergence-determination flag is kept "0" to end the routine.

After that, when the ECU 39 determines that the count value of the convergence-determination counter is greater than or equal to the convergence-determination time in step 219, the ECU 39 determines that the estimated air-fuel-ratio $\hat{\phi}\#i$ has been closer to the target value than the convergence-determination threshold for not less than the convergence-determination time. The procedure proceeds to step 221 in which the convergence-determination flag is set to "1".

Then, the procedure proceeds to step 222 in which the ECU 39 computes a steady-state gain "Kdc" based on a ratio between a variation in estimated air-fuel-ratio $\hat{\phi}\#i$ and a variation in fuel correction quantity Cmp#i. The cylinder-by-cylinder air-fuel-ratio estimation model is established based on the steady-state gain "Kdc". Specifically, the parameter "B" in the above formula (2a) is multiplied by the steady-state gain "Kdc". The process in step 202 corresponds to a gain reflecting portion.

When the ECU 39 determines that at least one of the estimated air-fuel-ratio $\hat{\phi}\#i$ of the cylinder is out of the convergence-determination range in step 217, that is, when the estimated air-fuel-ratio $\hat{\phi}\#i$ diverges, the procedure proceeds to step 220 in which the convergence-determination flag is reset to "0".

[LVCQ Computing Routine]

Figure 7:
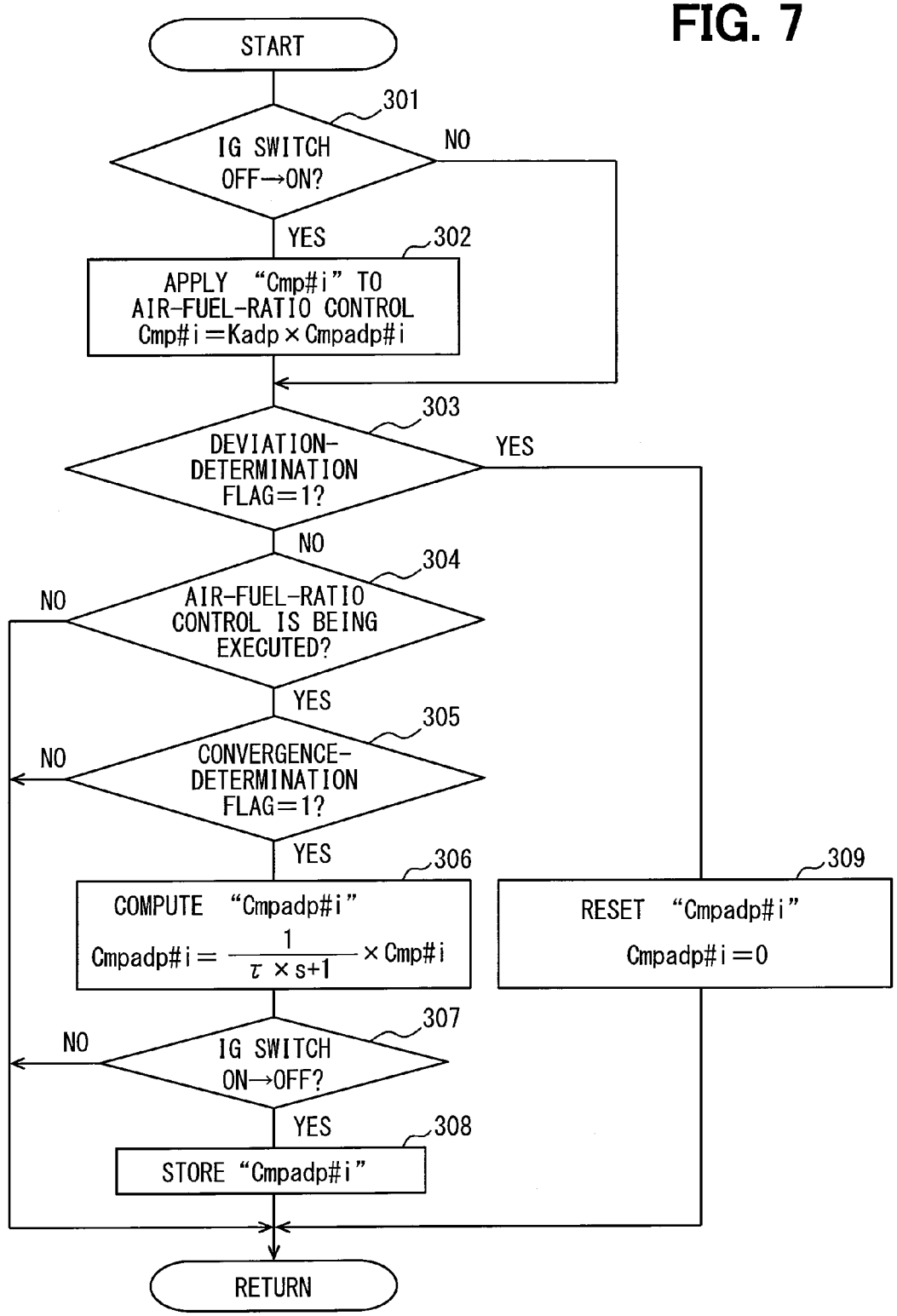
FIG. 7 is a flow chart showing a processing of a "LVCQ" computing routine.

An LVCQ computing routine shown in FIG. 7 is executed in synchronization with an output pulse of the crank angle sensor 33. The LVCQ computing routine corresponds to a learning portion. In step 301, the ECU 39 determines whether it is immediately after an ignition (IG) switch is turned ON from OFF.

When the answer is YES in step 301, the procedure proceeds to step 302 in which the cylinder-by-cylinder air-fuel-ratio control is executed based on the "LVCQ" Cmpadp#i that is stored in the backup memory of the ECU 39. Specifically, based on the "LVCQ" Cmpadp#i, the fuel correction quantity of each cylinder Cmp#i is computed according to a following formula.

$$Cmp\#i = Kadp \times Cmpadp\#i \qquad (7)$$

wherein "Kadp" is a coefficient that is not less than "0" and not greater than "1".

Then, the procedure proceeds to step 303 in which the ECU 39 determines whether a deviation-determination flag is "1". That is, the ECU 39 determines whether the air-fuel-ratio detection timing deviates from a proper timing. When a deviation in the air-fuel-ratio detection timing exists, the deviation-determination flag is set to "1".

When the answer is YES in step 303, the procedure proceeds to step 309 in which the "LVCQ" Cmpadp#i is reset to "0" to end the routine.

When the answer is NO in step 303, the procedure proceeds to step 304 in which the ECU 39 determines whether the cylinder-by-cylinder air-fuel-ratio control is being executed. When the answer is NO in step 304, the routine is finished without performing the subsequent steps.

When the answer is YES in step 304, the procedure proceeds to step 305 in which the ECU 39 determines whether the convergence-determination flag is "1". When the answer is No in step 305, the procedure ends without performing the subsequent steps. A computation of the "LVCQ" is prohibited until it becomes the "EACC". The process in step 305 corresponds to a leaning-prohibit portion.

When the answer is YES in step 305, the procedure proceeds to step 306 in which the "LVCQ" Cmpadp#i is computed based on the fuel correction quantity Cmp#i according to a following formula:

$$\text{Cmpadp}\#i = \{1/(\tau \times s + 1)\} \times \text{Cmp}\phi\char`\^ \#i \quad (8)$$

wherein Cmpadp#i represents the "LVCQ" of i-th cylinder #i.

Then, the procedure proceeds to step 307 in which the ECU 39 determines whether the ignition switch is turned OFF from ON. When the answer is YES in step 307, the procedure proceeds to step 308 in which the "LVCQ" Cmpadp#i is stored in the backup memory.

[Imbalance Diagnosis Routine]

An imbalance diagnosis routine shown in FIG. 8 is executed in synchronization with an output pulse of the crank angle sensor 33. The imbalance diagnosis routine corresponds to a diagnosis portion. In S401, the ECU 39 determines whether the cylinder-by-cylinder air-fuel-ratio control is being executed. When the answer is NO in step 401, the routine is finished without performing the subsequent steps.

When the answer is YES in step 401, the procedure proceeds to step 402 in which the ECU 39 computes a diagnosis-index "Value" based on the fuel correction quantity Cmp#i of each cylinder. In this case, the ECU 39 selects the fuel correction quantity of which absolute value is the largest value. The diagnosis-index "Value" is computed based on the selected fuel correction quantity Cmp#i (max) according to a following formula:

$$\text{Value} = (4/3) \times \text{Cmp}\#i(\text{max}) \quad (9)$$

Then, the procedure proceeds to step 403 in which the ECU 39 determines whether the convergence-determination flag is "1". That is, the ECU 39 determines whether it is the "EACC". When the answer is NO in step 403, the procedure ends without performing the subsequent steps.

When the answer is YES in step 403, the procedure proceeds to step 404 in which the ECU 39 determines whether the diagnosis-index "Value" has been greater than a malfunction-determination value "MDV" for not less than specified time period "TP".

When the answer is NO in step 404, the procedure proceeds to step 405 in which the ECU 39 determines that no imbalance exists between cylinders of the engine 11.

When the answer is YES in step 404, the procedure proceeds to step 406 in which the ECU 39 determines that an imbalance exists between cylinders of the engine 11.

Referring to FIG. 9, an example of execution of a correction quantity learning will be described.

When an execution condition of the cylinder-by-cylinder air-fuel-ratio control is established at a time t1, a cylinder-by-cylinder air-fuel-ratio estimation is started to estimate the air-fuel-ratio of each cylinder based on a detection value which the air-fuel-ratio sensor 36 detects at an air-fuel-ratio detecting timing for each cylinder. Further, the ECU 39 starts computing an observation residual "err" based on the detection value of the air-fuel-ratio sensor 36 and the estimated air-fuel-ratio.

When the observation residual "err" is greater than or equal to the permission threshold "K1on", the permit flag of cylinder-by-cylinder air-fuel-ratio control is kept "0" to prohibit the execution of the cylinder-by-cylinder air-fuel-ratio control. Further, the convergence-determination flag is kept "0" to prohibit the convergence-determination of the estimated air-fuel-ratio.

Then, when the observation residual "err" becomes less than the permission threshold "K1on" at a time t2, the permit flag of cylinder-by-cylinder air-fuel-ratio control is set to "1" to permit the execution of the cylinder-by-cylinder air-fuel-ratio control. The convergence-determination flag is set to "1" to permit the convergence-determination of the estimated air-fuel-ratio.

When it is permitted to execute the cylinder-by-cylinder air-fuel-ratio control, the ECU 39 computes an initial estimated air-fuel-ratio for each cylinder based on the estimated air-fuel-ratio in a specified period "A" before starting of the cylinder-by-cylinder air-fuel-ratio control. Furthermore, the ECU 39 establishes the convergence-determination threshold (specified value) for each cylinder and the convergence-determination time (specified time period) according to the initial estimated air-fuel-ratio.

When the initial estimated air-fuel-ratio has been computed at a time t3, the cylinder-by-cylinder air-fuel-ratio control is started. Then, when the observation residual "err" becomes greater than or equal to the prohibition threshold "K1off" at a time t4, the permit flag of cylinder-by-cylinder air-fuel-ratio control is reset to "0" to prohibit the execution of the cylinder-by-cylinder air-fuel-ratio control. The convergence-determination flag is reset to "0" to prohibit the convergence-determination of the estimated air-fuel-ratio.

Then, when the observation residual "err" becomes less than the permission threshold "K1on" at a time t5, the permit flag of cylinder-by-cylinder air-fuel-ratio control is set to "1" again to permit the execution of the cylinder-by-cylinder air-fuel-ratio control. The convergence-determination flag is set to "1" to permit the convergence-determination of the estimated air-fuel-ratio.

Then, when the estimated air-fuel-ratio of each cylinder becomes closer to the target value than the convergence-determination threshold at a time t6, the convergence-determination counter is incremented. Until the count value of the convergence-determination counter reaches the convergence-determination time, the convergence-determination flag is kept "0" to prohibit computing the "LVCQ".

Then, when the count value of the convergence-determination counter becomes greater than or equal to the convergence-determination time at a time t7, the ECU 39 determines that it is the "EACC". The ECU 39 sets the convergence-determination flag at "1" to permit the computation of the "LVCQ". The ECU 39 starts computing the "LVCQ" based on the fuel correction quantity of each cylinder.

After that, when the ignition switch is turned OFF from ON at a time t8, the "LVCQ" is stored in the backup memory of the ECU 39. Then, when the ignition switch is turned ON from OFF at a time t9, the cylinder-by-cylinder air-fuel-ratio control is executed based on the "LVCQ" stored in the backup memory of the ECU 39. That is, the fuel correction quantity of each cylinder is computed based on the "LVCQ".

According to the present embodiment described above, the ECU 39 determines whether the estimated air-fuel-ratio is converged. Until the ECU 39 determines that the estimated air-fuel-ratio is converged, it is prohibited to compute the "LVCQ". When the ECU 39 determines that the estimated air-fuel-ratio is converged, the "LVCQ" is computed. Therefore, it can be avoided to compute the "LVCQ" based on the fuel correction quantity that is obtained when the estimated air-fuel-ratio has not converged yet. An erroneous learning of the "LVCQ" can be avoided.

Furthermore, according to the present embodiment described above, when the estimated air-fuel-ratio has been closer to the target value than the convergence-determination threshold for not less than the convergence-determination time, the ECU 39 determines that the estimated air-fuel-ratio has converged. It can be avoided that the ECU 39 determines that the estimated air-fuel-ratio has converged only when the estimated air-fuel-ratio temporarily becomes closer to the target value than the convergence-determination threshold.

Furthermore, according to the present embodiment described above, the initial estimated air-fuel-ratio is computed based on the estimated air-fuel-ratio before the cylinder-by-cylinder air-fuel-ratio control is started. The convergence-determination threshold and the convergence-determination time are established based on the initial estimated air-fuel-ratio. Thus, the convergence-determination threshold and the convergence-determination time can be appropriately established according to the initial estimated air-fuel-ratio. For example, when the initial estimated air-fuel-ratio is relatively small, the convergence-determination time is established longer.

Moreover, according to the present embodiment, the observation residual is computed based on the detection value of the air-fuel-ratio sensor 36 and the estimated air-fuel-ratio. When the observation residual is less than the specified threshold, the ECU 39 determines whether the estimated air-fuel-ratio has converged. The estimation accuracy of the estimated air-fuel-ratio of each cylinder is improved. It can be accurately determined whether the estimated air-fuel-ratio has converged based on the estimated air-fuel-ratio.

Moreover, according to the present embodiment, when the estimated air-fuel-ratio diverges after it was determined that the estimated air-fuel-ratio converged, the determination is reset. That is, it is determined that the estimated air-fuel-ratio has not converged. The computation of the "LVCQ" is prohibited, so that an erroneous learning of the "LVCQ" can be certainly prevented.

Moreover, the "LVCQ" is stored in the backup memory when the ignition switch is turned OFF. Thus, even when the "LVCQ" has not been computed immediately after the ignition switch is turned ON, the cylinder-by-cylinder air-fuel-ratio control can be executed based on the previously stored "LVCQ".

Furthermore, when it is determined that the estimated air-fuel-ratio has converged, the steady-state gain "Kdc" is computed based on the variation in the estimated air-fuel-ratio and the variation in fuel correction quantity. Since the steady-state gain "Kdc" is applied to the cylinder-by-cylinder air-fuel-ratio estimation model, the gain of the cylinder-by-cylinder air-fuel-ratio estimation model can be established appropriately.

Moreover, after it is determined that the estimated air-fuel-ratio has converged, the imbalance diagnosis is conducted. Thus, an accuracy of the imbalance diagnosis can be enhanced.

Besides, the "LVCQ" may be stored in the backup memory at any time while the engine is running.

The initial estimated air-fuel-ratio may be computed based on the estimated air-fuel-ratio immediately after the cylinder-by-cylinder air-fuel-ratio control is started. In this case, a variation amount of the correction quantity may be restricted until the computation of the initial estimated air-fuel-ratio is completed.

The method for correcting the air-fuel-ratio detecting timing may be changed suitably.

The present disclosure can be applied to an engine having four cylinders and an engine having two, three, five or more cylinders.

The present disclosure is not limited to an intake port injection engine. The present invention can be applied to a direct injection engine or a dual injection engine.

What is claimed is:

1. A cylinder-by-cylinder air-fuel-ratio controller for an internal combustion engine, comprising:
    an air-fuel-ratio sensor detecting an air-fuel-ratio of an exhaust gas at a confluent portion into which the exhaust gas flows from each of multiple cylinders of the internal combustion engine;
    an estimation portion executing an air-fuel-ratio estimation for estimating the air-fuel-ratio of each cylinder based on a detection value which the air-fuel-ratio sensor detects at an air-fuel-ratio detection timing for each cylinder;
    a control portion executing a cylinder-by-cylinder air-fuel-ratio control in which the air-fuel-ratio of each cylinder is controlled based on the estimated air-fuel-ratio of each cylinder;
    a learning portion computing a learning value of a correction quantity for each cylinder, which is obtained by executing the cylinder-by-cylinder air-fuel-ratio control;
    a convergence-determination portion determining whether the estimated air-fuel-ratio has converged; and
    a learning portion prohibiting a computation of the learning value of the correction quantity for each cylinder until the convergence-determination portion determines that the estimated air-fuel-ratio has converged.

2. A cylinder-by-cylinder air-fuel-ratio controller according to claim 1, wherein
    the convergence-determination portion determines that the estimated air-fuel-ratio has converged when the estimated air-fuel-ratio has been closer to a target value than a specified value for not less than a specified time period.

3. A cylinder-by-cylinder air-fuel-ratio controller according to claim 2, further comprising:
    an initial-value computing portion computing an initial estimated air-fuel-ratio based on the estimated air-fuel-ratio immediately before or after executing the cylinder-by-cylinder air-fuel-ratio control, wherein
    the convergence-determination portion establishes at least one of the specified value and the specified time period according to the initial estimated air-fuel-ratio.

4. A cylinder-by-cylinder air-fuel-ratio controller according to claim further comprising:
    a residual computing portion computing an observation residual based on the detection value of the air-fuel-ratio sensor and the estimated air-fuel-ratio; wherein
    the convergence-determination portion determines whether the initial estimated air-fuel-ratio has converged when the observation residual is less than a specified threshold value.

5. A cylinder-by-cylinder air-fuel-ratio controller according to claim 1, wherein
    the convergence-determination portion resets a determination when the estimated air-fuel-ratio diverges after it is determined that the estimated air-fuel-ratio has converged.

6. A cylinder-by-cylinder air-fuel-ratio controller according to claim 1, wherein
    the learning portion stores the learning value of the correction quantity for each cylinder in a backup memory when an ignition switch is turned off.

7. A cylinder-by-cylinder air-fuel-ratio controller according to claim 1, further comprising:
    a gain reflecting portion computing a gain based on a variation of the estimated air-fuel-ratio and a variation of the fuel correction quantity when it is determined that the estimated air-fuel-ratio has converged, the gain reflecting portion applying the gain to the cylinder-by-cylinder air-fuel-ratio estimation.

8. A cylinder-by-cylinder air-fuel-ratio controller according to claim 1, further comprising:
a diagnosis portion diagnosing whether an imbalance malfunction occurs in the internal combustion engine based on the correction quantity for each cylinder after it is determined that the estimated air-fuel-ratio has converged.

9. A cylinder-by-cylinder air-fuel-ratio controller for an internal combustion engine, comprising:
an air-fuel-ratio sensor detecting an air-fuel-ratio of an exhaust gas at a confluent portion into which the exhaust gas flows from each of multiple cylinders of the internal combustion engine;
an estimation portion estimating the air-fuel-ratio in each cylinder based on a detection value which the air-fuel-ratio sensor detects at an air-fuel-ratio detecting timing for each cylinder;
a control portion executing a cylinder-by-cylinder air-fuel-ratio control in which the air-fuel-ratio in each cylinder is controlled based on the estimated air-fuel-ratio of each cylinder;
a learning portion computing a learning value of a correction quantity for each cylinder, which is obtained by executing the cylinder-by-cylinder air-fuel-ratio control;
a convergence-determination portion determining whether the estimated air-fuel-ratio has converged;
a learning prohibit portion prohibiting a computation of the learning value of the correction quantity for each cylinder until the convergence-determination portion determines that the estimated air-fuel-ratio has converged, and
a diagnosis portion diagnosing whether an imbalance malfunction occurs in the internal combustion engine based on the correction quantity for each cylinder, which is obtained by executing the cylinder-by-cylinder air-fuel-ratio control, after it is determined that the estimated air-fuel-ratio has converged.

\* \* \* \* \*